US008450891B2

(12) United States Patent
Gas et al.

(10) Patent No.: US 8,450,891 B2
(45) Date of Patent: May 28, 2013

(54) DEVICE FOR RECTIFYING CURRENT OF ELECTRIC ROTARY MACHINE AND ROTARY ELECTRIC MACHINE INCLUDING SUCH DEVICE

(75) Inventors: Olivier Gas, Paris (FR); Fabrice Tauvron, Athis-Mons (FR); Marc Tunzini, Versailles (FR); Régis Seidenbinder, Choisy le Roi (FR)

(73) Assignee: Valeo Equipments Electriques Moteur, Creteil (FR)

( * ) Notice: Subject to any disclaimer, the term of this patent is extended or adjusted under 35 U.S.C. 154(b) by 732 days.

(21) Appl. No.: 12/517,094

(22) PCT Filed: Dec. 20, 2007

(86) PCT No.: PCT/FR2007/052582
§ 371 (c)(1),
(2), (4) Date: Dec. 22, 2009

(87) PCT Pub. No.: WO2008/087333
PCT Pub. Date: Jul. 24, 2008

(65) Prior Publication Data
US 2010/0117466 A1    May 13, 2010

(30) Foreign Application Priority Data

Dec. 22, 2006  (FR) ..................... 06 55844
Mar. 30, 2007  (FR) ..................... 07 54188

(51) Int. Cl.
*H02K 5/18* (2006.01)
*H02K 9/06* (2006.01)
*H02K 11/04* (2006.01)

(52) U.S. Cl.
USPC .............................. 310/62; 310/227; 310/238

(58) Field of Classification Search
USPC ................. 310/62, 68 D, 227, 238, 64, 60 R, 310/89, 263
IPC ................. H02K 23/66,27/28, 5/14, 5/18, 9/06, H02K 11/04
See application file for complete search history.

(56) References Cited

U.S. PATENT DOCUMENTS

| 6,828,703 | B2* | 12/2004 | Einheuser et al. | 310/68 D |
| 6,859,019 | B2* | 2/2005 | Tornquist et al. | 322/68 |
| 6,882,069 | B1* | 4/2005 | Kashihara et al. | 310/68 D |
| 7,023,113 | B2* | 4/2006 | Tajima et al. | 310/68 D |
| 7,075,201 | B2* | 7/2006 | Takahashi et al. | 310/68 D |
| 2006/0202573 | A1* | 9/2006 | Uehara et al. | 310/68 D |
| 2006/0273671 | A1* | 12/2006 | Oohashi | 310/68 D |

* cited by examiner

*Primary Examiner* — Tran Nguyen
*Assistant Examiner* — Michael Andrews
(74) *Attorney, Agent, or Firm* — Berenato & White, LLC (57) ABSTRACT

A device for rectifying the current of a rotary electric machine comprising a bearing (50) with through openings (51) for a coolant, that comprises at least one module (100) including a holder (10, 16) for holding current rectifying members (93, 94) having the same phase as the machine, said holder (10, 16) including a heat sink (16) with vanes (18) at least partially covering an opening (51) in the bearing (50). A rotary electric machine including such a current rectifying device. Application: alternators of automotive vehicles with internal ventilation.

3 Claims, 11 Drawing Sheets

DEVICE FOR RECTIFYING CURRENT OF ELECTRIC ROTARY MACHINE AND ROTARY ELECTRIC MACHINE INCLUDING SUCH DEVICE

CROSS-REFERENCE TO RELATED APPLICATIONS AND CLAIM TO PRIORITY

This application relates to International Application No. PCT/FR2007/052582 filed Dec. 20, 2007, French Patent Application No. 0655844 filed Dec. 22, 2006 and French Patent Application No. 0754188 filed Mar. 30, 2007, of which the disclosures are incorporated herein by reference and to which priority is claimed.

DOMAIN OF THE INVENTION

The present invention concerns a device for rectifying the current of a rotary electrical machine, such as an alternator for a motor vehicle, containing a current rectifying device and a bearing of the rotary electrical machine provided with through-openings for a flow of coolant, such as air, and a rotary electrical machine, especially an alternator for a motor vehicle with internal ventilation, containing such a device.

STATE OF THE ART

Such a device and such a machine are described in the document WO 03/009452 (FR 2 827 437).

In this document, the rotary electrical machine is a polyphase alternator for a motor vehicle consisting of a casing carrying a stator surrounding a rotor which is integral with a shaft rotatably mounted in the casing.

The casing contains at least one front flange and one rear flange, each centrally carrying bearing means, such as a ball bearing, for rotary mounting of the shaft of the rotor. Such flanges are known respectively as the front bearing and the rear bearing.

The rotor is a toothed rotor or a salient pole rotor.

At least one excitation coil is associated with this rotor, preferably made from ferromagnetic material.

The stator consists of a body in the form of a stack of laminations carrying a polyphase stator coil. In one embodiment, the coil has conducting segments, and as a variant has a continuous wire.

Each phase of the stator and thus of the machine contains at least one winding.

The excitation coil, in one embodiment, is connected by wire connections to collector rings integral to the rear end of the rotor shaft. Brushes are allowed to rub against the rings. These brushes are carried by a brush holder which is usually integral with a voltage regulator.

In another embodiment, the excitation coil is fixed, the alternator having no brushes.

The extremities of the stator phases are connected to a current rectifying device carried by the rear bearing. A protective hood covers the rectifier device and is integral with the rear bearing.

The rectifier device/rear bearing assembly constitutes a rectifier.

The hood and the rear bearing are open-worked to allow circulation of a coolant, such as air, to the interior of the casing of the machine.

The rear bearing has a hollow form and consists of a bottom which is globally transverse-oriented in relation to the axis of the alternator combined with the axis of the shaft of the rotor. The bottom of the rear bearing contains through-openings for air.

This circulation of air is realised with the aid of at least one fan. In one embodiment, this fan is integral with the rotor.

As a variant, the fan is an external fan adjacent the front bearing, which is also open-worked.

As is known, when the excitation coil of the rotor is supplied with electricity and the shaft of the rotor rotates, the rotor is magnetised and an induced alternating current is generated in the stator coil.

This induced current is rectified into a direct current by the current rectifier device, in particular to recharge the battery of the vehicle and to supply the consumers of the on-board network of the vehicle with direct current.

The circulation of the air which is generated by the rotation of the fan or fans cools the rectifier device as well as the stator coil.

In the document WO 03/009452 the current rectifying device is provided with a current rectifying device containing diodes which are provided with a base, known as a cap, consisting of a solid main part, axially extended by a pedestal having at its free end a fixing face for a semiconductor element interposed between the pedestal and the head of a contact element in the form of a rigid wire, referred to as the tail of the diode or axis of the diode. The head of the tail of the diode and the semiconductor element are sheathed in resin. This resin is integral with the cap of the diode.

The current rectifying device carried by the rear bearing contains:
- a plurality of positive diodes supported by a positive holder carrying cooling vanes;
- a plurality of negative diodes supported by the bottom of the rear bearing;
- a connector to connect the tails of the diodes to the outputs of the stator phases.

The diodes constitute the current rectifying members.

In another embodiment, they are replaced by transistors of the MOSFET type.

The positive holder and the rear bearing are metallic, while the connector consists of a body made of plastic material in which partly uninsulated electrically-conductive tracks are embedded, in particular to create electrical contacts with the tails of the positive and negative diodes.

As can be seen in particular in FIG. 5 of this document WO 03/009452, the diodes extend parallel to the axis of the alternator and the connector is implanted radially above the electrically insulated positive holder carried by the rear bearing.

This device is satisfactory.

In another embodiment described in the document FR 2 729 802, the diodes do not have any tails.

Figure 1:
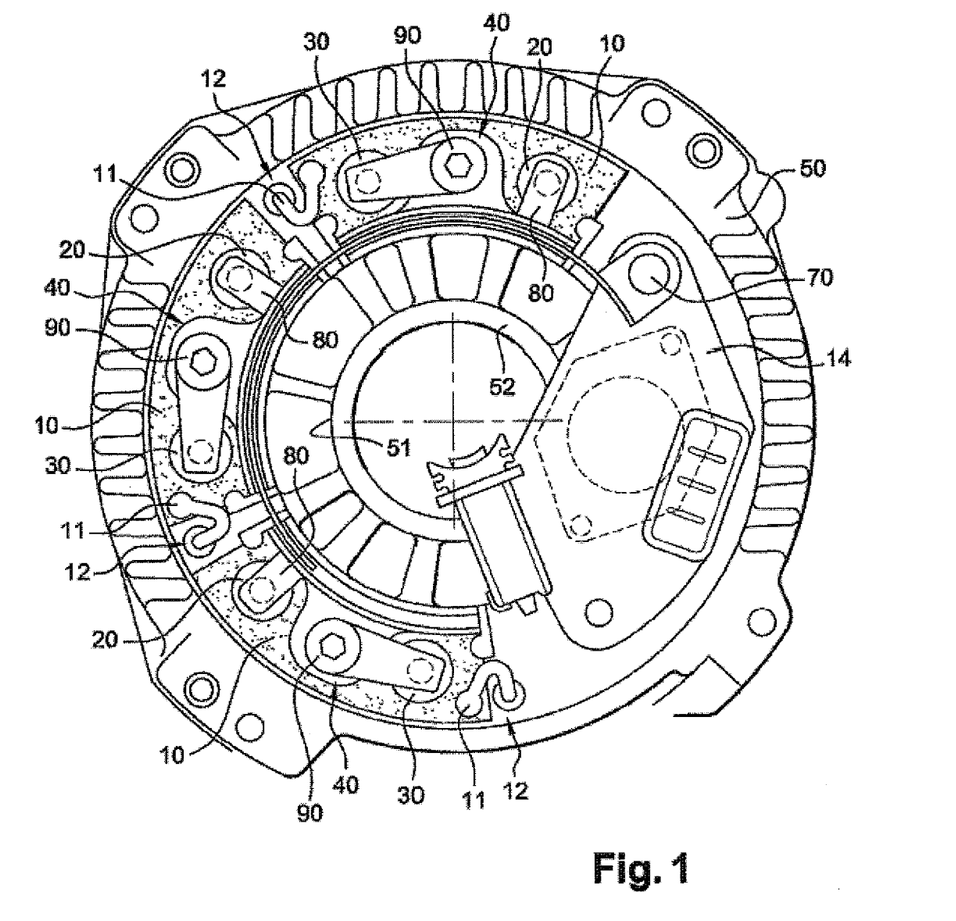
FIG. 1 is a frontal view of a current rectifying device for a motor vehicle alternator of prior art.

As can be seen in FIG. 1, which is a frontal view of a rectifier device for an alternator of a motor vehicle without the alternator hood, this document proposes mounting positive diodes 20 and negative diodes 30 on the cooling plates 10.

In this FIG. 1 can be seen the rear alternator bearing 50, the electrically-insulating parts 40 to insulate the plates 10 of the bearing 50, the terminal 70, referred to as terminal B+, of the alternator, which corresponds to the rectified output of the alternator designed to be connected via a cable to the positive terminal of the battery, the reeds 80, the fixing screws 90 for the plates 10 on the bottom of the bearing 50, the regulator-brush holder assembly 14, the through-openings 51 for air and the cylindrical core 52 internally delimiting the openings 51.

Each plate 10 is connected via a contact 11 to one of the phase outputs of the stator coil and is in contact with the anode of the positive diode 20, which it carries, and with the cathode of its negative diode 30.

The contact 11 passes through the plate 10 by means of an orifice 12 thereof.

For further details, please refer to this document FR 2 729 802.

This configuration enables the through-openings for air to be left clear and modules to be created in the form of plates carrying positive and negative diodes.

In the two aforementioned embodiments, the diodes are oriented axially in relation to the axial axis of symmetry of the alternator bearing.

Nevertheless, a problem arises in these aforementioned embodiments, because the alternator is installed under the bonnet in proximity to the thermal engine of the motor vehicle.

In fact, in view of the development of thermal engines for vehicles which are more and more confined, the ambient temperature under the bonnet is increasing more and more.

In certain cases, this ambient temperature can reach 140° C.

So it is desirable to be able to adapt these aforementioned current rectifying devices to these higher temperatures.

It is also desirable to increase the power of the rotary electrical machine.

The same problem arises when the thermal engine is fixed and is confined to the interior of a compartment.

SUMMARY OF THE INVENTION

The object of the present invention is to meet these requirements.

One aim of the present invention is therefore to create a current rectifying device which works at higher ambient temperatures.

Another object of the invention is to increase the power of the machine.

According to the invention, a current rectifying device for a polyphase rotary electrical machine provided with an axial axis of symmetry, of the type consisting of a current rectifying device and a bearing belonging to the rotary electrical machine and containing a bottom globally transverse-oriented in relation to the axial axis of symmetry of the machine, said bottom being, firstly, provided with through-openings for a coolant, and secondly, carrying the electrically insulated current rectifying device containing at least one module consisting of a holder carrying the current rectifying members having the same phase of the machine, is characterised in that the holder of the module contains a heat sink with vanes and in that the vanes of the heat sink at least partially cover an opening of the bearing.

According to the invention, a rotary electrical machine, in particular an alternator for a motor vehicle with internal ventilation of the type indicated above, is characterised in that it contains such a current rectifying device.

With the aid of the invention, the current rectifying members are effectively cooled, since the heat sink extends the holder transversely towards the interior and is positioned in the flow of the coolant, such as air.

The current rectifying members also have an axis of symmetry which extends transversely so as to enable the axial volume requirement of the machine to be reduced.

With the aid of the invention, the bearing of the machine can be standardised.

In one embodiment, the heat sink is provided with fine vanes.

These vanes extend, in one embodiment, globally perpendicularly to the semiconductor elements of the current rectifying members.

The bottom of the current rectifying members, such as the bottom of the bases of the diodes, may thus transmit heat to the heat sink.

In one embodiment, this bottom is in direct contact with the heat sink.

In another embodiment, the bottom of the current rectifying members, such as the bottom of the bases of the diodes, may be used to assemble the heat sink, for example by gluing or soldering.

According to still other characteristics:
in one embodiment, the heat sink with vanes contains a base;
in one embodiment, the base carries the current rectifying members;
in another embodiment, the base is separate from a part carrying the current rectifying members;
the base may be joined onto this part carrying the current rectifying members by soldering, welding or gluing;
as a variant, the base is fixed to this part with the aid of at least one fixing member, such as a screw, or by crimping, or by latching;
in one embodiment, a thermally-conductive element is interposed between the base and the part carrying the current rectifying members, such as diodes or transistors of the MOSFET type;
in one embodiment, this part consists of a plate;
in one embodiment this plate contains protuberances to receive the bases of the current rectifying members of one phase of the machine.

Obviously, all of the aforementioned characteristics can be considered in isolation and/or in combination.

In all cases, it is possible to increase the power of the machine, since the current rectifying members are better cooled. The machine can operate in an environment with a higher temperature.

Other characteristics and advantages of the invention will become apparent from reading the detailed description which follows, which will be better understood by making reference to the attached drawings.

DESCRIPTION OF EMBODIMENTS

In the figures, common or similar elements will be assigned the same reference numbers.

Figure 2:
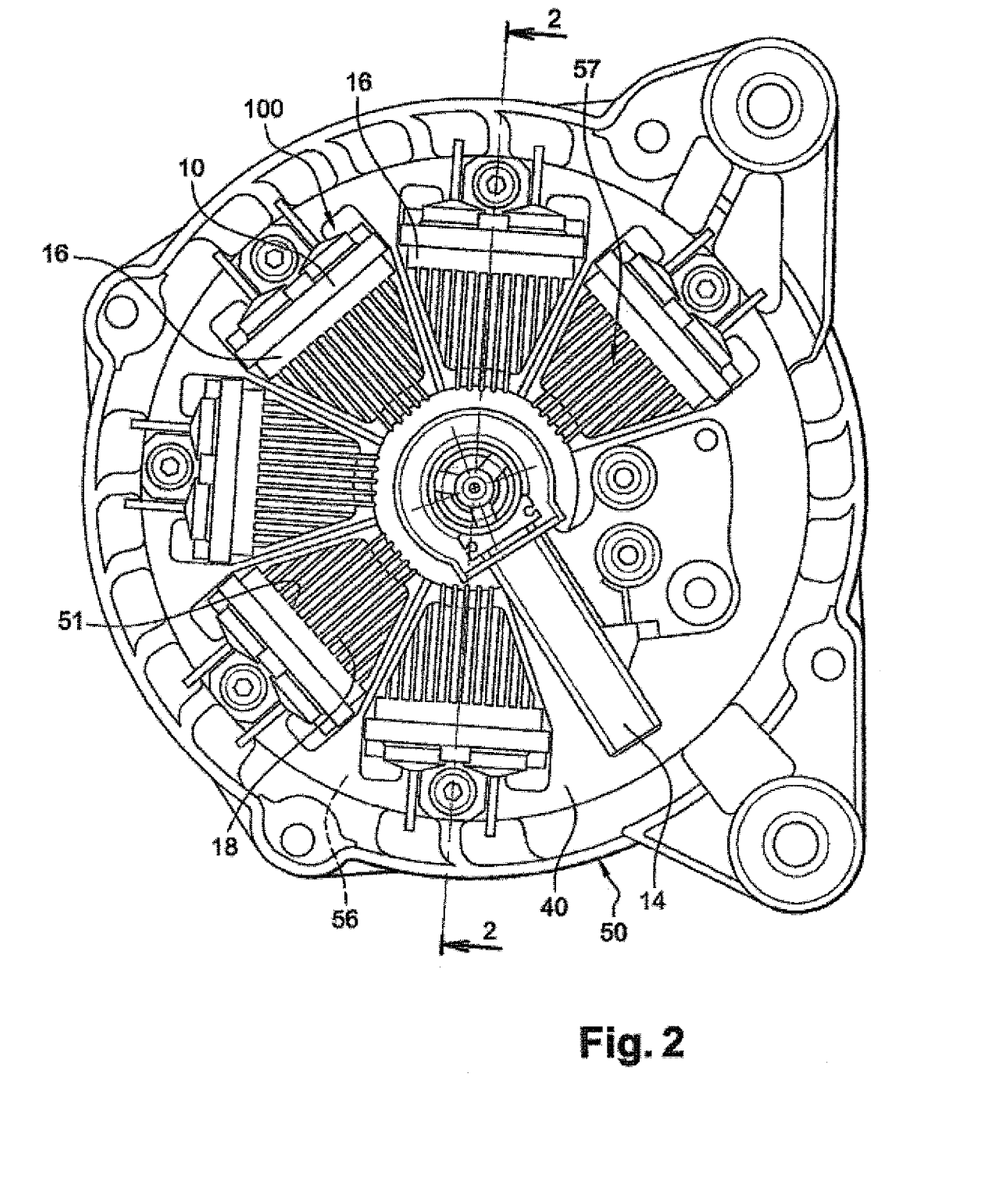
FIG. 2 is a frontal view, similar to FIG. 1, of a current rectifying device for a motor vehicle alternator according to the invention.
Figure 3:
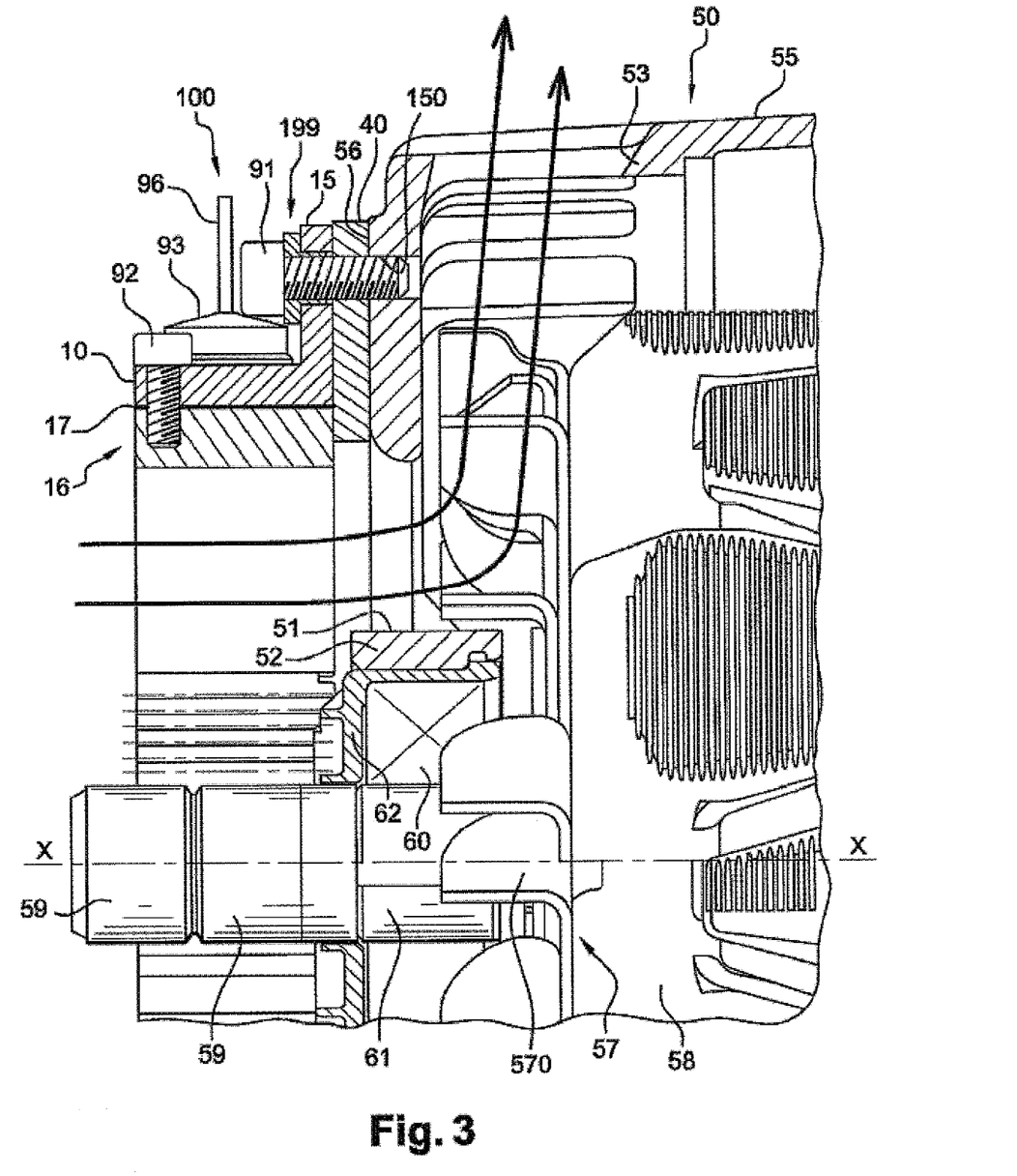
FIG. 3 is a partial sectional view along the line 2-2 of FIG. 2.
Figure 4:
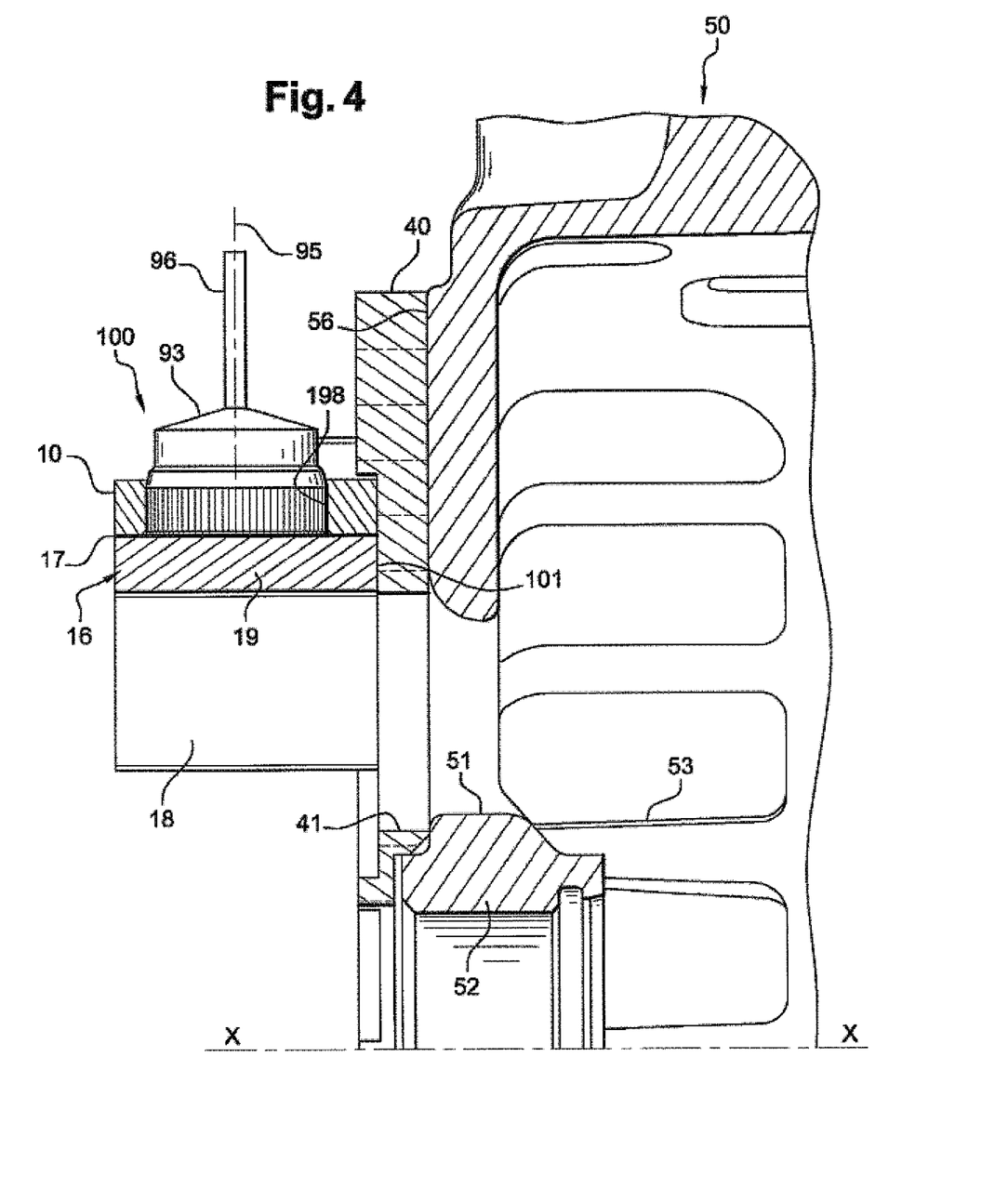
FIG. 4 is a view similar to FIG. 3 without the rotor and without the winding of the rotary electrical machine.

In FIGS. 2 to 4, the rotary electrical machine shown is a polyphase alternator for a motor vehicle with internal ventilation, for example of the type as described in the aforementioned documents EP 0 515 259 and WO 03/009452, in which the current rectifying device has been replaced by that of the invention, which takes up less space axially and cools better.

The alternator shown in FIG. 2 contains 6 phases and 6 AC-DC rectifier modules according to the invention at the rate of one module per phase.

These modules 100 are carried, here with electrical insulation in the way described below, by the bottom 56 (FIGS. 3 and 4) of the rear bearing 50 of the alternator.

This bearing 50 is metallic here, preferably in mouldable material such as aluminium. The bearing 50 is electrically connected to earth.

The current rectifying modules belong to the current rectifying device and thus to the current rectifying device according to the invention.

This device contains the current rectifying device which is integral with a flange of the alternator, in this case constituted by the alternator rear bearing.

The rectifying device-rear bearing assembly thus constitutes the current rectifying device. This device forms a unitary assembly which can be handled and transported.

The number of modules 100 is a function of the number of phases.

So, for a three-phase alternator, the number of modules is three, for a pentaphase alternator the number of modules is 5.

In the example shown, 1 to 6 modules 100 can be mounted, with the presence of the brush holder-voltage regulator assembly 14.

So the current rectifying device according to the invention contains at least one module, and in one embodiment the alternator can be of the monophase type.

According to one characteristic, each module 100 contains a holder 10, 16 for the current rectifying members 93, 94.10 associated with one phase of the alternator.

Each holder 10, 16 is designed to be electrically connected to the output of the phase concerned.

The holder 10, 16 is electrically and thermally conductive.

The holder contains a part carrying the current rectifying members 93, 94.

In the embodiment in FIGS. 2 to 7, the holder 10, 16 contains a plate 10 constituting the supporting part for current rectifying members.

The plate 10 is metallic in this case and carries the current rectifying members 94, 93 of the phase concerned.

In this embodiment these members 93, 94 consist of positive and negative diodes as in FIG. 1.

The positive diode 93 is designed to be electrically connected to the terminal B+, while the negative diode 94 is designed to be connected to earth here (FIGS. 3 and 4) via the bottom 56 of the rear bearing 50.

Figure 8:
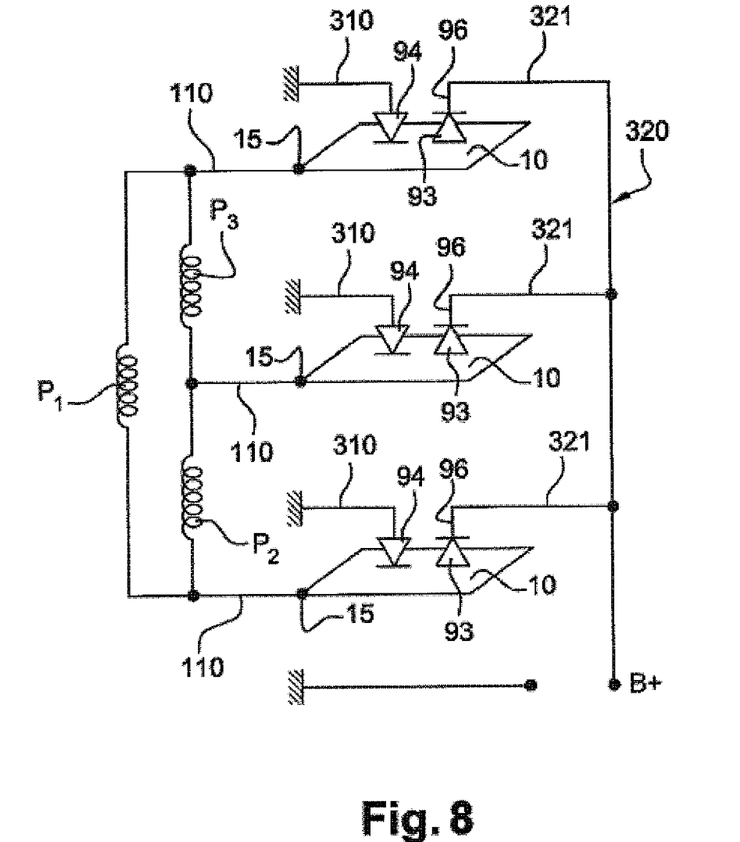
FIG. 8 is a diagram of part of the electrical circuit of the current rectifying device.

The anode of the positive diode 93 is in electrical contact with the plate 10 and the same applies for the cathode of the negative diode 94, as can be seen better in FIG. 8. This figure shows three phases P1, P2, P3, triangle-mounted, of the stator of the rotary electrical machine.

The machine contains three other triangle or star-mounted phases here, as described in document U.S. Pat. No. 4,163,187. Of course, it is possible to double the number of grooves in the body of the stator. Of course, the machine may consist of just three phases and three modules in the aforementioned manner.

An electrically insulating part 40 is inserted between the plate 10 and the bearing 50 (FIGS. 3 and 4).

According to one characteristic of this embodiment, the holder 10, 16 of a module 100 contains a heat sink 16 which extends towards the centre of the machine, i.e. globally transversely.

In this embodiment the plate 10 is prolonged towards the interior by the heat sink 16, which is integral with the plate 10.

This heat sink 16 is metallic in this case, for example having an aluminium or copper base.

This heat sink 16 is integral with the plate 10 and at least partly covers an opening for the passage of air 51 so that the module 100 is well cooled.

In one embodiment the heat sink 16 may extend so as to overlap two openings 51 and partly cover these.

In this case, the heat sink entirely covers an opening 51 so that it is even better cooled.

These openings 51, in the embodiment from FIG. 2, are identical in shape.

According to one characteristic, the current rectifying members 93, 94, in this case diodes, and the heat sink 16 extend on either side of the plate 10.

According to one characteristic, the heat sink 16 is arranged in the flow of coolant, in this case air. This flow is generated by the rotation of a fan 57.

This fan 57 can be seen more easily from FIG. 3. This figure has arrows representing the circulation of the cooling air generated by the rotation of the fan 57, which is equipped with blades 570.

In this figure can be seen, as 58, part of the rotor of the alternator. This rotor 58 is in this case a toothed rotor or as a variant, a salient pole rotor.

The fan 57 is integral with the rear end of the rotor 58. This fan 57 is, in this case, a high-powered fan. This fan 57 contains a large number of blades 570 and in this case is of the type as described in the document WO 2004/106748. It thus contains two basic fans, one on top of the other, each fan containing a flange provided with a plurality of blades 570 preferably distributed at irregular intervals to reduce noise. This fan 57 is attached, for example by welding, to the rear end of the rotor 58, here with the aid of welding spots belonging, for example, to the flange of the internal basic fan. The basic external fan is attached to the internal fan, for example, using welding points or adhesive. These basic fans are metallic in this case.

The fan 57 here is of the centrifuge type.

The blades 570 spin past the openings 51 to draw in fresh air and expel the air by means of air outlet openings 53 described below.

In this FIG. 3 can be seen, as 61, the shaft which is integral with the rotor 58 and as 59 the collector rings carried by the rear end of the shaft 61. These are the rings rubbed against, in conventional manner, by the brushes carried by the brush holder connected to the voltage regulator of the assembly 14.

The X-X axis constitutes the axial axis of symmetry of the shaft 61 and that of the machine.

The heat sink 16 extends transversely in relation to this axis.

It can be seen that the rear bearing 50 is hollow in form and contains a bottom 56, globally transverse-oriented in relation to the X-X axis. This bottom is prolonged at its external periphery by a rim 55 globally axially-oriented in relation to the X-X axis.

The openings 51 here are air inlet openings. In this case the openings are globally trapezoidal in shape and are delimited radially towards the interior by the cylindrical core 52 of the axis combined with the X-X axis.

The bottom 56 of the bearing 50 contains a continuous part at the exterior of the openings 51 to mount the plates 10 of the modules 100 here.

The internal periphery of the core 52 delimits the central opening of the bearing 50. This opening is used as a passage for the rear end of the shaft 61.

The internal periphery of the core 52 is also used to mount the ball bearing 60 interposed radially between the external periphery of the shaft 61 and the internal periphery of the core 52 for the rotatable mounting of the shaft 61. A capsule 62 is interposed radially between the internal periphery of the core 52 and the external periphery of the ball bearing 60 to absorb expansion differences.

The rim 55 is provided with a plurality of air outlet openings 53, axially oblong in shape.

The number of openings, in this case the air outlet openings 53, in this embodiment is greater than the air inlet openings 51.

Each series of openings 51, 53 consists of a plurality of openings separated from each other by arms, oriented radially for the openings 51 and oriented axially for the openings 53 respectively, which as variants may be inclined axially, bearing in mind that the openings 53 here affect the external periphery of the bottom 56.

For greater clarity, the stator and its coil have not been shown here, so that the course of the air can be seen.

As a variant, the rim 55 has no openings 53 and, in the way known in the art, a fan is installed at the front of the alternator, the course of the air in this case being axial.

In FIGS. 2 and 3, similarly, the protective hood covering the assembly 14 and the current rectifying device with modules 100 have not been shown.

Each electrically conductive plate 10 is axially oriented in relation to the X-X axis, as can be better seen in FIGS. 3 and 4.

The plate is in indirect contact with the bottom 56 via its edge, with interposition of the electrically insulating member 40, while the bearing 50 is electrically conductive and is connected to earth.

According to one characteristic, the lower edge 101 (FIG. 4) of the plate 10 thus extends globally perpendicularly to the bottom 56.

Figure 6:
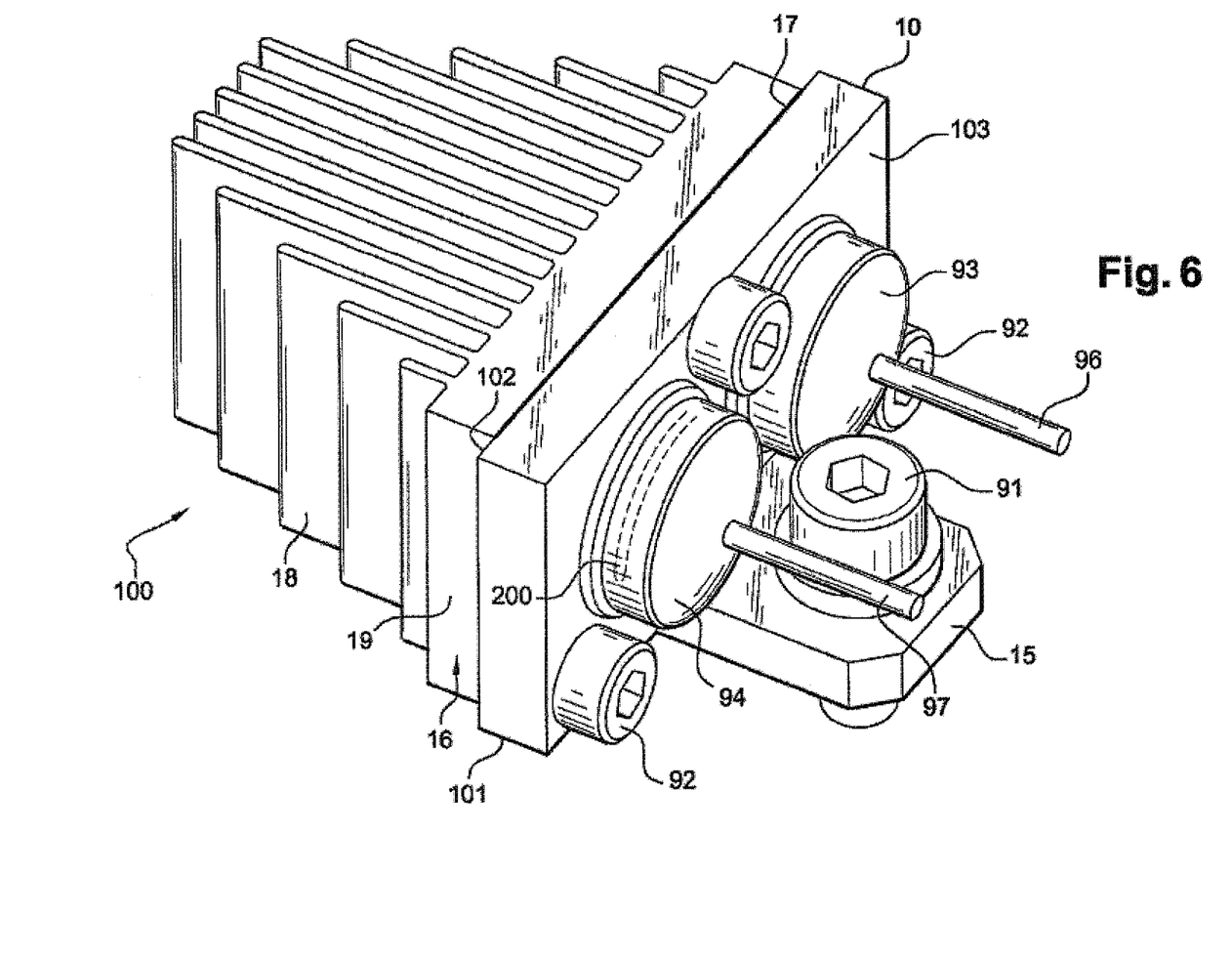
FIG. 6 is a perspective view of the module from FIG. 5.

This plate 10 thus extends globally perpendicularly in relation to the bottom 56 of the bearing 50 with the result that, as can be seen in FIG. 6, its upper face 103 carries the current rectifying members 93, 94 and its lower face 102 the heat sink 16, arranged in the flow of air generated by the rotation of the fan 57.

The holder 10, 16 thus includes a part 10, which extends perpendicularly in relation to the bottom 56 of the bearing 50.

The heat sink 16 contains a plurality of vanes 18, as can be better seen in FIG. 2. The vanes 18 are integral with a base 19 which the heat sink 16 presents adjacent the lower face 102 of the plate 10.

These vanes 18 are fine. In this case, the vanes 18 have been obtained by moulding with the base 19 presented by the heat sink 16 adjacent the lower face 102 of the plate 10.

This heat sink 16 has a globally trapezoidal shape, the large foundation of which, constituted by the base 19, is adjacent the plate 10.

The globally trapezoidal shape of the heat sink is obtained, in one embodiment, by means of vanes 18, which have different lengths, as can be better seen in FIG. 6.

In one embodiment, the heat sink 16 is all of a piece with the plate 10. In this case, the holder 10, 16 of the current rectifying members 93, 94 is all in one piece. The base 19 is merged with the plate 10 and carries the current rectifying members. This base is perpendicular to the bottom 56 of the bearing 50.

This heat sink is, for example, obtained by moulding with the plate 10. The plate 10 and the heat sink are, for example, made of aluminium.

In another embodiment, the base 19 is distinct from the plate 10. The base 19 is attached to the plate 10.

So, as a variant, the heat sink 16 is attached by means of its base 19 to the plate 10.

In one embodiment, the heat sink 16 is attached to the plate 10 by means of at least one fixing member 92, such as a screw, a bolt or a pin.

In the embodiment shown, this is realised by means of three screws 92 inserted in the form of a triangle and screwed into the base 19.

As a variant, the base 19 of the heat sink is welded, soldered or glued onto the lower face of the plate 10. The adhesive is thermoconductive.

In another variant, the heat sink is attached by latching onto the plate. For example, the base 19 contains hooked fasteners, which each pass through an opening of the plate to engage with the upper face of the plate.

In yet another variant, the base 19 of the heat sink is attached to the plate by means of crimping.

In the embodiment shown, a heat-conducting member 17 is interposed between the plate 10 and the heat sink 16. In this case, the member 17 is interposed between the lower face 102 of the plate and the upper face of the base 19 and is tightened using means of fixation 92.

The member 17 may consist of thermoconductive adhesive.

As a variant, the member 17 consists of a sheet of thermally conductive plastic material known as a thermal pad.

In general, the electrical function of the module 100 is realised by means of the plate 10, constituted as a variant by the base 19, and the current rectifying members 93, 94, while the function of dissipation of heat is realised by the heat sink 16 positioned in the airflow.

In the embodiments described, the heat sink is not electrically insulated with respect to the plate 10 carrying the current rectifying members 93, 94 and good thermal conduction is effected between the current rectifying members 93, 94, carried by the plate 10 which is also thermally conductive, and the heat sink 16.

Of course, the heat sink may be electrically insulated in relation to the plate equipped with the members 93, 94 while still having good thermal conduction.

So in one embodiment, the member 17 is also electrically insulating.

In one embodiment, this member consists of electrically insulating and thermally conductive adhesive.

As a variant, the member 17 is a thermal pad, which is electrically insulating.

This pad is, for example, covered on each of its faces by a layer of electrically insulating and thermally conductive adhesive to fix it onto the plate 10 and the base 19.

In one embodiment, this pad is clamped between the base 19 and the lower face 102 of the plate, this clamping being effected by means of at least one fixing member 92, such as a screw, a bolt or a pin fixing the plate to the base.

In this case, electrically insulating base portions must be provided, of the type which can be seen as 199 in FIG. 3.

Figure 9:
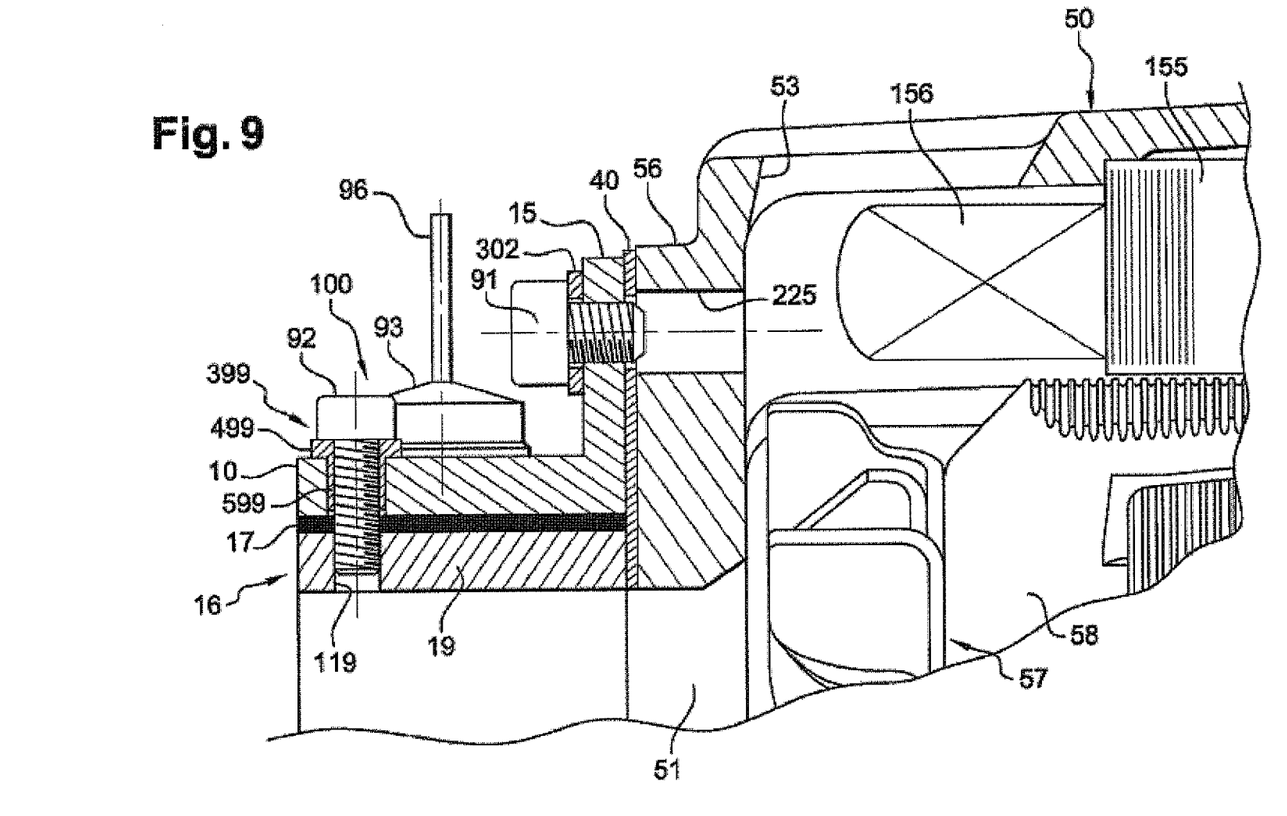
FIG. 9 is a partial view similar to FIG. 3 for another embodiment.

More precisely, as can be seen in FIG. 9, this base portion 399 includes a head 499 in the form of a washer as a rest for the head of the fixing member 92, such as a screw or a bolt, prolonged by a sleeve 599 penetrating into a through-hole of the plate (no reference number) to electrically insulate the shank of the fixing member with respect to the plate. The base then includes a hole 119 which is threaded when the fixing member 92 is a screw or smooth when the fixing member is a bolt. Three screws 92 may be provided and inserted as can be seen in FIG. 6. FIG. 9 shows a partial view of the body 155 of the stator carrying the stator coil 156, projecting in relation to the body 155 to form a coil end 156 at each axial end of the body 155.

Obviously, it is possible to invert the structures, the head of the fixing member being situated alongside the lower face of the base, the threaded hole or the hole through which passes the shank of the organ 92 being created in the plate. This structural inversion is applicable in all cases, with or without the member 17.

As a variant, this pad 17 may be clamped and fixed by means of elastic electrically insulating clips resting on the upper face of the plate 10 and on the lower face of the base 19.

This mode of fixation is applicable in all cases, with or without the member 17.

The plate 10, and thus the holder 10, 16, contains at least one protuberance 15 to fix it onto the rotary electrical machine, in this case on the bottom 56 of the bearing 50.

Here the protuberance extends in the opposite direction to the heat sink 16.

This protuberance 15 extends here perpendicularly to the plate 10.

The protuberance 15 consists of a perforated disc through which passes a fixing member 91, here in the form of a screw. The disc 15 extends centrally from the bottom part of the plate, which in this case is globally rectangular in shape.

The base 19 also has a globally rectangular shape.

The disc 15 extends parallel to the bottom 56 of the bearing 50.

The plate 10 equipped with its disc 15 is obtained, for example, by cutting and folding.

An electrically insulating part 40 is interposed between the module 100 and the bottom 56 of the bearing 50.

This part 40 is provided with an opening 41 which is identical in shape to that of the opening 51 associated with the module 100. This part exhibits a variation in thickness forming an indentation 42 corresponding to the shape of the module 100 to accommodate the module and hold it by wedging.

The part 40 thus contains an indentation to receive the disc 15.

The base 19 and the plate 10 are in contact with the part 40 by their edge. This part 40 may be separate, being associated with each module. In this case, the part 40 is common to all the modules 100, as can be seen in FIG. 2. So it is also interposed between the assembly 14 and the bottom 56 and has openings corresponding to those of the bottom 56.

It will be noted that the means of fixation 91, such as screws, are electrically insulated in relation to the plate 10. Thus, one can see as 199 in FIG. 3 an electrically insulating base portion enabling the screw 91 to be insulated from the plate 10. This base portion has an annular head on which rests the head of the screw 91 which is screwed into the threaded hole 150 of the bottom 56 and a sleeve penetrating into the hole through which passes the shank of the screw 91, said hole being created in the disc 15 in order to insulate the shank of the screw from the disc. The shank of the screw passes through the part 40 provided with an opening for this purpose.

In one embodiment, the part or parts 40 are also thermally insulating when the bearing 50 is hotter, while functioning, than the module 100. As a variant, the part or parts 40 are thermally conductive when the bearing is colder, while functioning, than the module 100.

Everything depends on the temperature attained during functioning by the stator, which in one variant may be carried by an intermediate part of the casing of the machine interposed between the front and rear bearings, said intermediate part being cooled by circulation of the coolant fluid.

In the light of FIG. 6, the compactness of the solution can be appreciated, the diodes 93, 94 each being installed between two means of fixation 92, while the disc 15 is long enough to avoid any interference between the diodes 93, 94 and the fixing member 91 extending in a plane perpendicular to the diodes 93, 94.

It will be noted that each diode 93, 94 has a tail 96, 97, which extends in the opposite direction to the heat sink 16.

These tails 96, 97 are, in this case, identical in length and extend parallel to the fine vanes 18, as can be better seen in FIG. 6.

These vanes 18 extend perpendicularly to the base 19 and have decreasing lengths at the ends of the base 19 to provide the heat sink with a globally trapezoidal shape.

These diodes have a cap 98 provided with a bottom 99. The heat sink 16 has vanes 18 extending perpendicularly to the plate 10 and to the bottoms 99 of the caps 98 of the diodes 93, 94.

Improved evacuation of heat is thus effected, since the bottoms 99 contribute to the evacuation of heat by the fact that they are in contact with the thermally conductive member 17, or as a variant, directly with the heat sink 16. This heat is evacuated by the heat sink which is positioned in the air flow.

So there is better evacuation of heat by positioning the heat sink 16 on one side of the plate and the current rectifying members on the other side.

Moreover, the solution is more compact axially than that in the document WO 03/009452, since the tails 96, 97 of the diodes 93, 94 are oriented transversely towards the exterior and not axially.

The axis of symmetry 95 of the tails 96, 97 and of the diodes 93, 94 also extends perpendicularly in relation to the plate 10 and to the base 19. The axes 95 are oriented transversely in relation to the X-X axis.

The caps 98 of the diodes in this case are milled for a forced fit in the associated opening 198 of the plate 10, this type of diode being known as a "pressfit diode".

As a variant, the diodes may be soldered or glued onto the plate.

Obviously, the opening 198, as a variant, is a blind hole so that the bottoms 99 of the diodes are in contact with the plate 10 and also with the heat sink when the latter is all in one piece with the plate.

Figure 5:
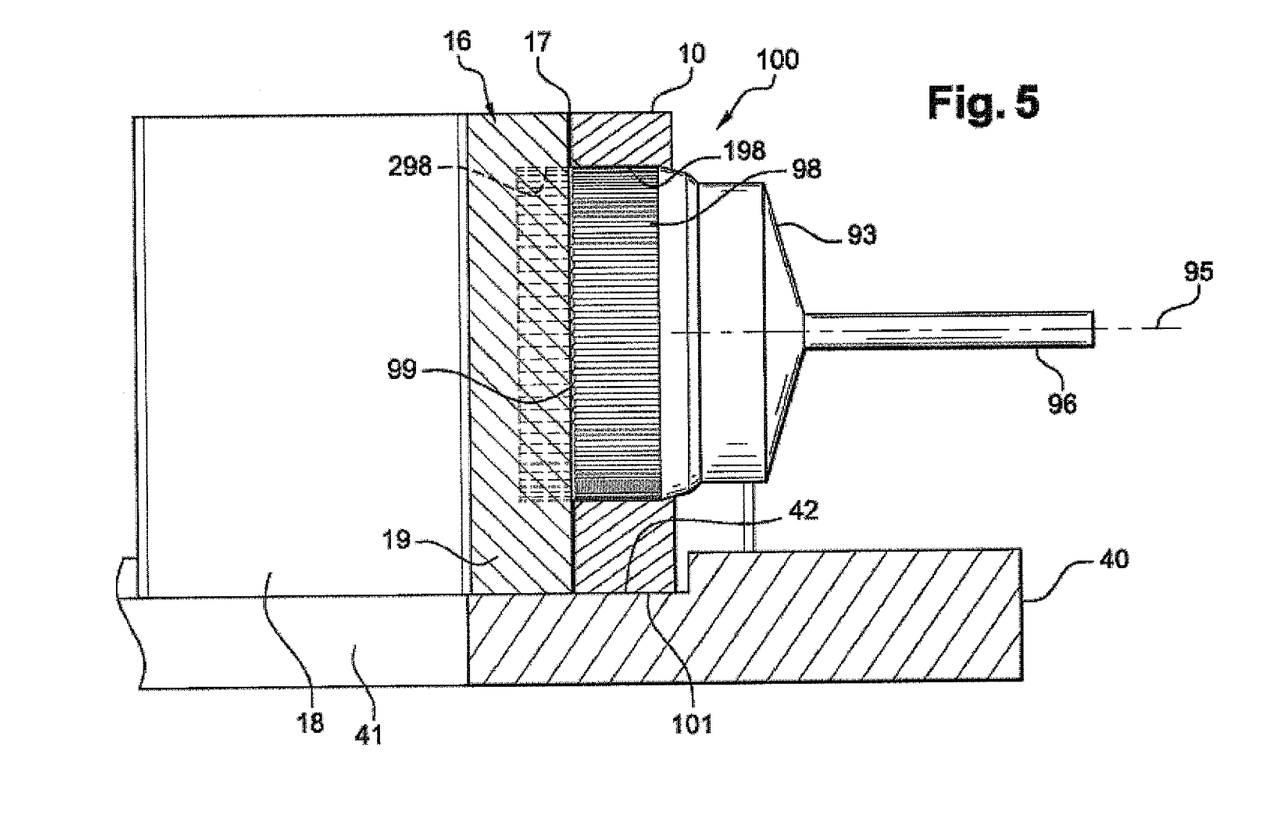
FIG. 5 is a view of the module of the current rectifying device from FIG. 4.

As a variant, the opening 198 may be prolonged by a blind hole made in the base 19 of the heat sink 16 as can be seen in dotted outline as 298 in FIG. 5.

The milled part of the diode then extends into this blind hole 298 and participates in fixing the heat sink 16.

As a variant, the opening 198 is a through-hole, but the bottom 99 is at a distance from the heat sink 16.

All combinations are possible. For example, in one embodiment, the cap 98 of the diode projects in relation to the lower face 102 of the plate 10 so that a space exists between the base 19 of the heat sink 16 and the plate 10, the bottoms 99 of the diodes integral with the plate 10 serving, for example by gluing or soldering, to fix the heat sink 16.

The space serves to provide effective cooling.

The diodes which are integral with the plate may thus serve to fix the heat sink.

Of course, the pad 17 may be perforated in the area of the bottoms of the diodes for direct contact with the base of the heat sink, the assembly of the plate with the base being created by the aforementioned means, for example, by crimping, latching, clamping, gluing, welding or soldering. All combinations are possible.

Obviously, the tails 96, 97 of the diodes 93, 94 may have a different length in order to utilise diodes of prior art.

As a variant, the diodes have no tails.

In general the diodes 93, 94 are better cooled due to the fact that they are associated with the vanes 18 of the heat sink 16 which are transversely long and the axial volume requirement is reduced due to the orientation of the diodes.

These diodes can be replaced by MOSFET transistors so that the current rectifying members are not necessarily diodes. These members always contain a semiconductor member 200, represented by dotted lines in FIG. 6, which extends perpendicularly to the vanes 18 and parallel to the plate 10.

As will be apparent from the description and from the drawings, the current rectifying members are installed at the external periphery of the bottom 56 of the rear bearing 50, at the exterior of the air inlet openings 51 so that these openings or louvres of the rear bearing are clear and the radial length of the vanes 18 of the heat sink is as long as possible transversely.

Obviously, by using discs 15, the plate 10 can be installed lower down towards the centre, the vanes 18 then being shortened.

The external periphery of the bottom 56 may have an inclined portion.

The module or modules 100 are well cooled so that the rectifier device, containing the modules 100 and the bearing 50, can operate at higher temperatures.

The power of the machine can be increased due to the improved cooling of the module or modules 100.

A very good thermal equilibrium of the rectifier device containing the bearing 50 equipped with several modules 100 is achieved, because standardised modules 100 are used.

The invention makes it possible to omit phase connectors.

So, in one embodiment, the output of the phase associated with the module 100 concerned is connected directly to the plate, for example being fixed by welding onto the plate.

Likewise, the tail of a negative diode may be connected by a wire contact to the bearing 50 which is earthed.

In another embodiment (FIG. 7), part of the annular head 299 of the base portion 199 is drawn out in order to fit a first metallic washer 301 in contact with the head of the screw 91 either side of this head and a second washer 302 in contact with the disc 15 which is electrically insulated from the bottom 56 of the bearing by the part 40.

Figure 7:
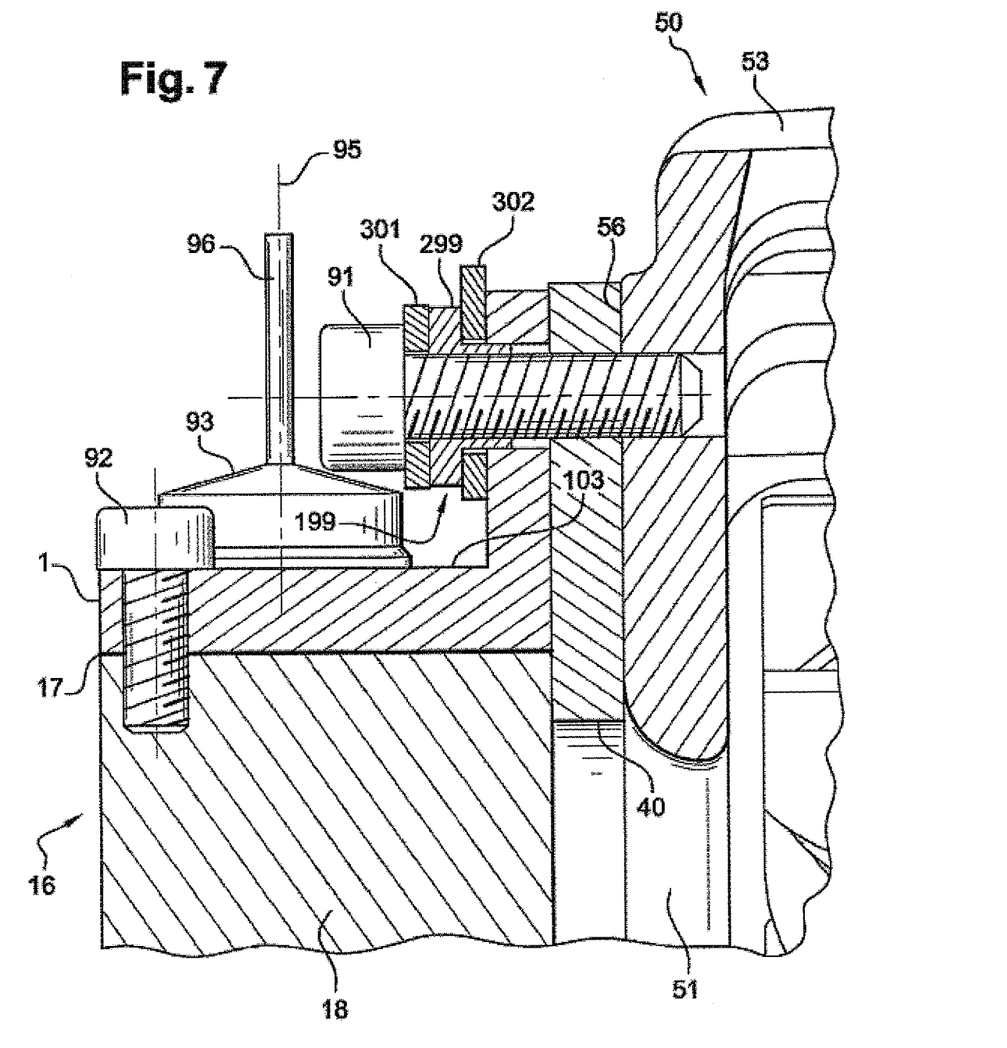
FIG. 7 is a partial view similar to FIG. 4 showing part of the contact means of the module—to earth and to the phase respectively.

The washers 301, 302 are electrically insulated from each other by the head of the base portion 199.

In one embodiment, the first washer 301 belongs to a first electrical contact 310 with a short length (FIG. 8) connected to the diode tail 97 of the negative diode 94. This washer 301 is earthed via the screw 91. The second washer 302, in contact with the disc 15 of the plate 10, belongs to a second electrical contact 110 (FIG. 8) connected to the phase P1, P2, P3 concerned.

The disc 15 and the fixing member 91 thus also act as electrical contact of the module 100, with the phase and earth respectively.

As shown in diagram form in FIG. 8, the tail 96 of each positive diode 93 can be electrically connected to the terminal B+ via an arc-shaped electrically conductive member 320.

This member 320 is integral with the terminal B+, not shown for the sake of simplicity in FIG. 2. Reeds 321 or other rigid contacts connect each tail 97 electrically to the member 320 of the rigid type.

Obviously the reeds 321 and the member 320 can be embedded in plastic material in order to be electrically insulated, while being uninsulated locally at the level of the tails 97 and of the terminal B+.

Obviously, the present invention is not limited to the embodiments described. So, as a variant, the machine may be brushless so that there is no need for a brush holder, which may allow a seventh module to be fitted. The voltage regulator may even be mounted elsewhere and thus supplementary modules may be mounted.

The bearing 50 may be standardised and receive a number of modules depending on the applications.

As a variant, the modules can be supported by the bottom of the front bearing of the machine. A module can be created to rectify the neutral point when the phase outputs are star-connected.

The plate 10, which is rectangular in shape in the figures, may have a different shape, preferably oblong. The same applies for the base 19, which advantageously matches the shape of the plate 10.

The disc 15 can be replaced by lugs installed at the ends of the plate.

Slight inclinations may be provided. Thus the plate extends globally perpendicularly to the bottom 56 and the vanes 18 extend globally perpendicularly to the plate 10.

Obviously, in the aforementioned way, the diodes or other current rectifier members may serve to fix the heat sink 16 or participate in the fixation of the heat sink, for example using means of fixation 92.

The diodes may extend either side of the plate and serve to fix the heat sink.

The heat sink is attached to the plate or at a slight distance therefrom.

Figure 10:
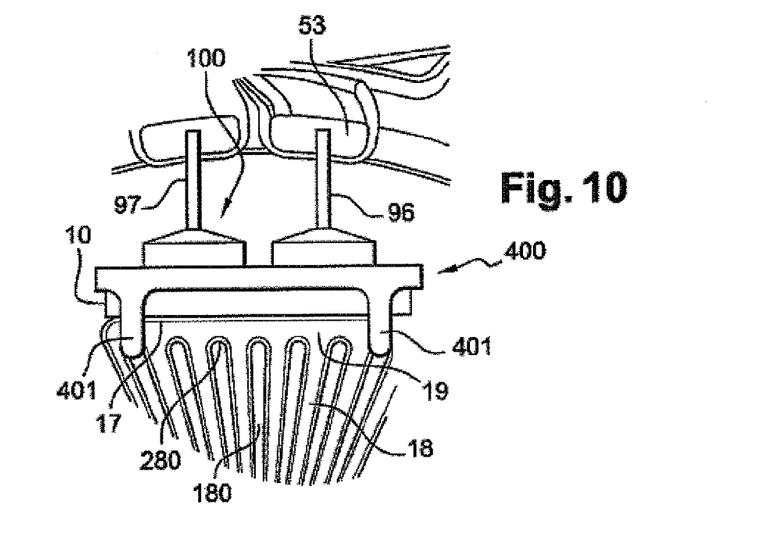
FIG. 10 is a partial top view of a module mounted on its bearing, showing a variant fixation of the heat sink on its module.

The structures may be inverted, so in the embodiment shown in FIG. 10 the heat sink 16 is made integral with the plate 10 of the module 100 by latching using at least one hooked fastener separate from the heat sink 16.

More precisely, in the embodiment shown in FIG. 10, the plate 10 of the module 100 is made integral with the heat sink 16 by latching using an electrically insulating plate 400, which rests on the external face of the plate 10 of the module and has at least one deployable hooked fastener 401. The hook of this fastener is designed to engage with the external edge 280 of an aperture 180 delimited by two consecutive vanes 18 of the heat sink 16.

Figure 11:
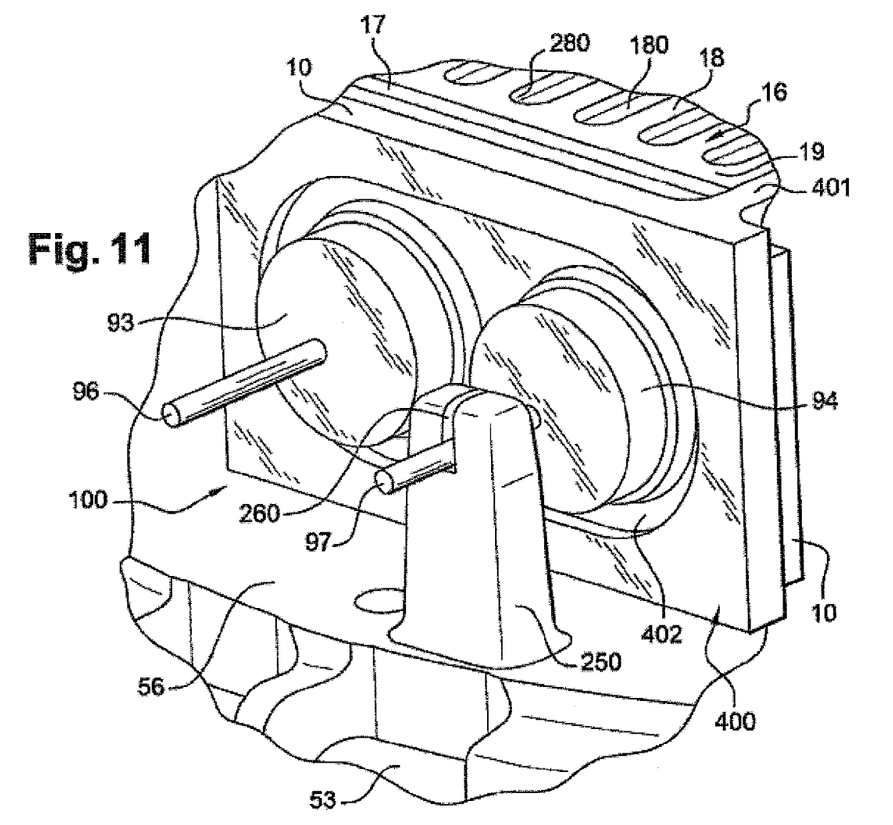
FIG. 11 is a partial perspective view of the variant fixation from FIG. 10, showing a variant of an electrical contact of a negative diode with the bearing.

As can be seen from FIG. 11, this electrically insulating plate 400 has a clearance 402 for the current rectifying members 93, 94 of the module 100. This clearance is in the form of an oblong hole in this case.

Here the plate 400 has two hooked fasteners 401 extending above the heat sink 16 to engage by their hook with the external edge 280 of an aperture 180. The fasteners are installed in proximity to the lateral edges of the plate 400, which in this case covers the plate 10 of the module 100.

As will have been understood, the plate 400 with hooked fasteners 401 allows the plate 10 of the module in contact with the member 17, such as thermoconductive adhesive or a thermoconductive pad, to be tightened.

The first electrical contact 310, as a variant, includes, as can be seen in FIG. 11, a projection 250 carried by the bearing 50. In this embodiment, the bottom 56 of the bearing 50 has axially oriented projections 250 to form an electrical contact of the tails 97 of the negative diodes 94 with the bearing 20.

This contact is created by welding, crimping, latching or clamping the tails in the projections which have an aperture 260 for this purpose at their free ends to receive the tail concerned.

As a variant, the projection 250 consists of a conduit obtained by moulding with the bottom 56 and carrying an attached copper member, for example in the form of a nail sunk into the conduit, for connection by welding or any other means, of the end of the tail 97 of the negative diode 94 with the head of the nail.

As a variant, the projection is attached to the bottom 56 of the bearing 50, for example by welding, riveting, screwing or any other means. This projection consists, for example, of a copper member joined to the bottom 56, for example by riveting or welding, and having a head affixed, for example by welding, to the end of the tail 97 of the negative diode 94.

Figure 12:
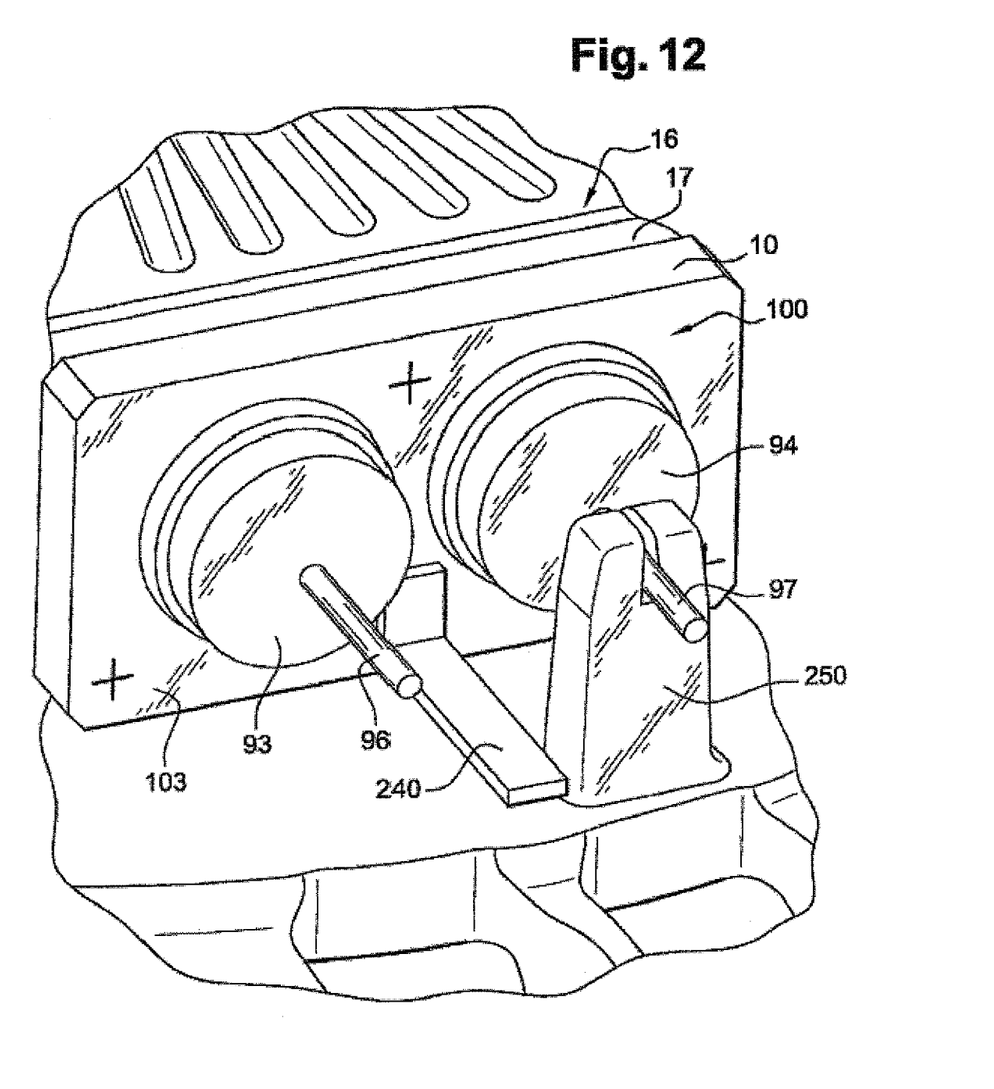
FIG. 12 is a view similar to FIG. 11 for yet another embodiment.

As a variant, as can be seen in FIG. 12, the second electrical contact with the phase concerned contains an electrically conductive reed 240, in this case L-shaped or as a variant, T-shaped, fixed onto the upper face 103 of the plate 10 of the module 100, for example, by welding or gluing.

As a variant, as can be seen in FIG. 9, the electrically conductive reed 302 is retained and the electrically conductive reed 302 from FIG. 7 is omitted. In this case, the hole in the disc 15 is threaded to screw in the screw which passes through an opening of the electrically insulating member. The bottom 56 then presents, in correspondence with the holes in the disc 15 and the member 40, a clearance of greater diameter, such as a blind hole 225 or in this case, a through-hole to avoid any contact of the screw 91 with the bearing 50.

The contact between the tails 97 of the diodes 94 and the bearing can be realised using projections of the type shown in FIG. 12.

All combinations are possible.

The fan 57 may be of the centripetal type, so that the openings 51 are, in this case, outlet openings and the openings 53 are air inlet openings.

In another embodiment, the fan is a simple fan.

It may have axial and radial action.

Two internal fans may be provided, as in the previously cited document EP 0515 259.

As a variant, a single internal fan is provided.

As will be apparent from the description and the drawings, the external periphery of the bottom 56 is recessed, because it does not receive any diodes. This external periphery may have an inclined portion in order to direct air towards the stator coil, more precisely towards the projecting end referred to as the coil end of this coil, by means of the openings 53.

Obviously, as a variant, the module 100 may carry a different electronic component.

Equally, the thermal engine may, as a variant, be a fixed thermal engine.

This engine may be confined in a compartment.

The alternator is, in one variant, reversible. This type of alternator is called an alternator-starter and in particular is used to start the thermal engine.

In this case, MOSFET type transistors are used instead of the diodes 93, 94.

Obviously, in FIGS. 10 to 12, the heat sink-module assembly may be attached with electrically insulating glue to the bottom of the bearing so that the presence of the protuberance or protuberances 15 is not obligatory.

As a variant, electrically insulating screws may be used to affix this assembly to the bearing concerned of the casing of the machine using one or more protuberances 15.

As a variant, the plate 10, and thus the holder 10, 16, contains protuberances.

For example the plate contains two protuberances each facing a milled cap of a diode 93, 94 fitted by force into a blind hole of the relevant protuberance of the plate 10, so that the bottom of the cap is in contact with the bottom of the blind hole and transmits heat in the aforementioned manner.

In one embodiment the protuberances receiving the caps of the diodes project in relation to the upper face of the plate.

In another embodiment the protuberances receiving the caps of these diodes project in relation to the internal face of the plate while staying in contact with the member 17. There is thus a clearance between the protuberances.

In this case the member 17 may be in two parts, each part being associated with one protuberance.

The clearance may be arc-shaped.

Hence, the part 10 carrying the current rectifying members need not necessarily be in the form of a plate.

Obviously, as a variant, the bearing 50 carrying the module (s) has a flat shape and constitutes a cover closing off the other part of the casing of the machine.

The heat sink 16-modules 100 assembly or assemblies may, instead of projecting towards the exterior in relation to the front or rear bearing 50 concerned, project towards the interior in relation to the bearing concerned.

The heat sink-module assembly or assemblies may thus extend to the interior of the machine.

The hood of the machine is, as a variant, constituted by the rear bearing.

Obviously, the different modes of fixation of the heat sink 16 with its plate may be combined.

So at least one of the fixing members 92 may be replaced by fixation using a diode or partial gluing. The diodes may be used to fix the heat sink in the aforementioned manner in combination with gluing or fixing by crimping, or using clips or latching with a single hooked fastener.

The fixing members may consist of rivets.

Fixation by gluing may be realised in several parts in combination, for example, with fixation by means of a fixing member.

Equally, a pad may be combined with gluing of several parts.

It will be appreciated that the holder 10, 16 carries the current rectifying members 93, 94 having the same phase, which enables the volume requirement of the current rectifying device to be reduced and cuts down on the number of parts, because there is no need to provide one heat sink for the positive diode and another for the negative diode. The heat sink according to the invention is common to both diodes. Moreover, the existing openings 51 are used, without the need to create other openings and damage the mechanical strength of the bearing.

The invention claimed is:

1. A current rectifying device for rectifying the current of a polyphase rotary electrical machine provided with an axial axis of symmetry (X-X) and comprising a bearing (50) having a bottom (56) transverse-oriented in relation to the axial axis of symmetry (X-X) of the machine, the bottom (56) provided with through-openings (51) for a coolant and bearing the current rectifying device;

the current rectifying device comprising at least one AC-DC rectifier module (100) including a holder (10, 16) bearing current rectifying members (93, 94) having the same phase of the machine;

the holder (10, 16) of the AC-DC rectifier module (100) including a heat sink (16) with vanes (18) at least partially covering one of the openings (51) of the bearing (50);

the heat sink (16) including a base (19) and the vanes integral with the base (19);

the holder (10, 16) including an electrically-conductive plate (10) carrying the current rectifying members (93, 94) and separate from the heat sink (18);

the electrically-conductive plate (10) being integral with the base (19) of the heat sink (16);

the electrically-conductive plate (10) of the AC-DC rectifier module (100) being integrated with the heat sink (16) by latching with the aid of an electrically-insulating plate (400) resting on an external face of the plate (10) of the module (100) and having at least one deployable hooked fastener (401) such that a hook of the fastener (401) engaging an outer edge (280) of an aperture (180) delimited by two consecutive vanes (18) of the heat sink (16).

2. A current rectifying device for rectifying the current of a polyphase rotary electrical machine provided with an axial axis of symmetry (X-X) and comprising a bearing (50) having a bottom (56) transverse-oriented in relation to the axial axis of symmetry (X-X) of the machine, the bottom (56) provided with through-openings (51) for a coolant and bearing the current rectifying device electrically insulated from the bearing (50);

the current rectifying device comprising at least one AC-DC rectifier module (100) including a holder (10, 16) bearing current rectifying members (93, 94) having the same phase of the machine;

the holder (10, 16) of the module (100) including a heat sink (16) with vanes (18) at least partially covering one of the openings (51) of the bearing (50);

the holder (10, 16) attached to the bottom (56) of the bearing (50);

the holder (10, 16) including an electrically-conductive part (10) carrying the current rectifying members (93, 94), integral with the base (19) of the heat sink (16) and separate from the heat sink (18);

the heat sink (16) including a base (19) and the vanes being integral to the base (19);

the electrically-conductive part (10) including an electrically-conductive plate (10);

wherein the plate (10) is metallic; and wherein the current rectifying members (94, 93) comprising a negative diode (94) including a cathode in contact with the plate (10) and an anode designed to be connected to earth, and of a positive diode (93) including an anode in contact with the plate (10) and a cathode designed to be connected to the phase of the electrical machine.

3. A rotary electrical machine, comprising:

an axial axis of symmetry (X-X);

a bearing (50) including a bottom (56) transverse-oriented in relation to the axial axis of symmetry (X-X) of the electrical machine and provided with through-openings (51) for a coolant;

at least one fan to generate a flow of air through the through-openings (51) of the bottom (56) of the bearing (50); and an electrically-insulated current rectifying device (100-93, 94) mounted to the bottom (56) of the bearing (50) and electrically insulated therefrom;

the current rectifying device comprising at least one AC-DC rectifier module (100) including a holder (10, 16) bearing current rectifying members (93, 94) having the same phase of the electrical machine;

the holder (10, 16) of the AC-DC rectifier module (100) attached to the bottom (56) of the bearing (50) and including a heat sink (16) with vanes (18) at least partially covering one of the openings (51) of the bearing (50);

the heat sink (16) of the AC-DC rectifier module (100) disposed in the flow of air;

the holder (10, 16) including an electrically-conductive part (10) carrying the current rectifying members (93, 94) and separate from the heat sink (18);

the electrically-insulated current rectifying device (100-93, 94) mounted to the bottom (56) of the bearing (50) by attaching the electrically-conductive part (10) thereto;

wherein the electrically-conductive plate (10) is metallic; and wherein the current rectifying members (94, 93) comprising a negative diode (94) including a cathode in contact with the plate (10) and an anode designed to be connected to earth, and of a positive diode (93) including an anode in contact with the plate (10) and a cathode designed to be connected to the phase of the electrical machine.

* * * * *